United States Patent
Noel et al.

(10) Patent No.: US 10,761,874 B2
(45) Date of Patent: Sep. 1, 2020

(54) DYNAMIC VIRTUAL INPUT/OUTPUT AND NUMA NODE MANAGEMENT

(71) Applicant: Red Hat, Inc., Raleigh, NC (US)

(72) Inventors: Karen Lee Noel, Pembroke, NH (US); Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 93 days.

(21) Appl. No.: 16/201,286

(22) Filed: Nov. 27, 2018

(65) Prior Publication Data

US 2020/0167178 A1    May 28, 2020

(51) Int. Cl.
*G06F 9/455* (2018.01)

(52) U.S. Cl.
CPC ...... *G06F 9/45558* (2013.01); *G06F 9/45545* (2013.01); *G06F 2009/4557* (2013.01); *G06F 2009/45579* (2013.01); *G06F 2009/45583* (2013.01); *G06F 2009/45595* (2013.01)

(58) Field of Classification Search
CPC ............ G06F 9/45558; G06F 9/45545; G06F 2009/4557; G06F 2009/45579
See application file for complete search history.

(56) References Cited

U.S. PATENT DOCUMENTS

| | | | | |
|---|---|---|---|---|
| 8,468,288 B2 * | 6/2013 | Corry | ................... | G06F 9/4856 711/170 |
| 8,719,545 B2 * | 5/2014 | Pandey | ................. | G06F 9/4856 709/232 |
| 9,699,093 B2 | 7/2017 | Krishnaprasad et al. | | |
| 9,800,523 B2 | 10/2017 | Guan et al. | | |
| 2011/0296406 A1 * | 12/2011 | Bhandari | ............... | G06F 9/5044 718/1 |
| 2013/0139154 A1 * | 5/2013 | Shah | ................... | G06F 9/45558 718/1 |
| 2014/0366027 A1 * | 12/2014 | Tsirkin | ................ | G06F 9/44505 718/1 |
| 2015/0067229 A1 | 3/2015 | Connor et al. | | |
| 2017/0289036 A1 | 10/2017 | Vasudevan | | |
| 2017/0364279 A1 | 12/2017 | Banerjee et al. | | |
| 2018/0101486 A1 | 4/2018 | Lu et al. | | |

OTHER PUBLICATIONS

Nelson et al., "Fast Transparent Migration for Virtual Machines" (Year: 2005).*
https://specs.openstack.org/openstack/nova-specs/specs/rocky/approved/numa-aware-vswitches.html.
https://docs.openstack.org/nova/latest/admin/networking.html.

* cited by examiner

*Primary Examiner* — Phillip H Nguyen
(74) *Attorney, Agent, or Firm* — Haynes and Boone, LLP (57) ABSTRACT

A method includes, migrating a guest operating system from a first hypervisor to a second hypervisor, the first hypervisor utilizing a first virtual networking device associated with a first Non-Uniform Memory Access (NUMA) node, the first virtual networking device corresponding to a physical network device. The method further includes, after the migrating, with the second hypervisor, providing to the guest operating system, a second virtual networking device associated with a second NUMA node, the second virtual networking device having a same physical address as the first virtual networking device, the second virtual networking device corresponding to the physical network device.

20 Claims, 5 Drawing Sheets

DYNAMIC VIRTUAL INPUT/OUTPUT AND NUMA NODE MANAGEMENT

BACKGROUND

The present disclosure relates generally to virtual computing systems, and more particularly, use of physical Peripheral Component Interconnect (PCI) devices for virtual computing systems.

A host machine (e.g., computer or server) is a computing system that is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

In many cases, a host machine has multiple processors. Some host machines with multiple processors utilize Non-Uniform Memory Access (NUMA) architecture. Such architecture involves multiple NUMA nodes, each NUMA node representing a region of host memory and a subset of the multiple processors. That way, each processor can access the region of memory in its own NUMA node faster than it can access memory in other NUMA nodes. It is desirable to have virtual machines that operate with such architecture in an efficient manner.

SUMMARY

According to one example, a method includes, with a guest operating system managed by a first hypervisor, utilizing a first virtual networking device associated with a first Non-Uniform Memory Access (NUMA) node, the first virtual networking device corresponding to a physical network device. The method further includes migrating from the first hypervisor to a second hypervisor and, after the migrating, with the guest operating system, utilizing a second virtual networking device associated with a second NUMA node. The second virtual networking device has a same physical address as the first virtual networking device. The second virtual networking device corresponds to the physical network device.

According to one example, a method performed by a physical computing system includes providing a plurality of Non-Uniform Memory Access (NUMA) nodes and providing a plurality of virtual networking devices. Each of the virtual networking devices is associated with a different one of the plurality of NUMA nodes. Each of the virtual networking devices has the same physical address. The method further includes, with a guest operating system, utilizing a first one of the virtual networking devices corresponding to a first one of the NUMA nodes while the guest operating system is associated with the first one of the NUMA nodes. The method further includes, with a guest operating system, utilizing a second one of the virtual networking devices corresponding to a second one of the NUMA nodes while the guest operating system is associated with the second one of the NUMA nodes and no longer associated with the first one of the NUMA nodes.

A system includes a processor, a physical network device, and a memory having a plurality of regions, each region corresponding to a different one of a plurality of Non-Uniform Memory Access (NUMA) nodes. The memory further includes machine readable instructions that when executed by the processor, cause the system to, with a first hypervisor, support a guest operating system, the first hypervisor providing a first plurality of virtual networking devices to the guest operating system, each of the first plurality of virtual networking devices associated with a different one of the plurality of NUMA nodes. The machine readable instructions are further to migrate the guest operating system to a second hypervisor, the second hypervisor providing a second plurality of virtual networking devices to the guest operating system, each of the second plurality of virtual networking devices associated with a different one of the plurality of NUMA nodes. The first plurality of virtual networking devices and the second plurality of virtual networking devices share a physical address.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, some physical host machines use NUMA architecture. NUMA architecture involves multiple NUMA nodes, each NUMA node representing a region of host memory and a subset of the multiple processors. When virtual machines are executed on such host systems, the guest may be assigned a region of guest memory. In some examples, the guest memory may fit within a single NUMA node. However, some larger guest nodes may have enough guest memory to span multiple NUMA nodes. In other words, when such a host machine provides a virtual machine to a guest, the guest memory for a particular guest may be fragmented across multiple NUMA nodes. A virtual machine can also include virtual NUMA nodes that map to underlying host NUMA nodes to allow the virtual machine to operate more efficiently.

Various computing processes, such as transmitting and receiving data over a network, may be managed in accordance with the NUMA node architecture. For example, a hypervisor may typically present a virtual Network Interface Card (NIC) to a guest machine. To operate more efficiently, that virtual NIC may be placed into the same NUMA node as the guest that is using it. Thus, when the guest places data in memory that is to be transmitted over the network, it places that data in the same NUMA node as the virtual NIC. This way, the data does not have to be transferred from one NUMA node to another before it is transmitted through the virtual NIC.

Sometimes, however, various events may cause the NUMA nodes associated with a particular guest operating system to change. For example, the guest operating system may migrate to a different hypervisor. Alternatively, the guest may shrink so as to use fewer NUMA nodes. When such an event occurs, the virtual NIC may no longer be placed in a NUMA node associated with the guest. This may slow down the performance of the guest operating system and the host system that supports that guest operating system.

According to principles described herein, a hypervisor presents multiple virtual devices, such as virtual networking devices (e.g., virtual Network Interface Card (NIC)) to a guest, each virtual device corresponding to a different NUMA node. In some examples, each of the virtual devices may share the same physical address (e.g., Media Access Control (MAC) address). A guest may then use the virtual device for one of its NUMA nodes. If an event occurs that causes the guest to be associated with a different NUMA node, then the guest can simply use the virtual device of that different NUMA node. Because all the virtual devices share the same physical address, the transition is more seamless. For example, Address Resolution Protocol (ARP) tables do not have to be updated. Additionally, the virtual devices that are not being used by a guest may remain inactive.

Figure 1:
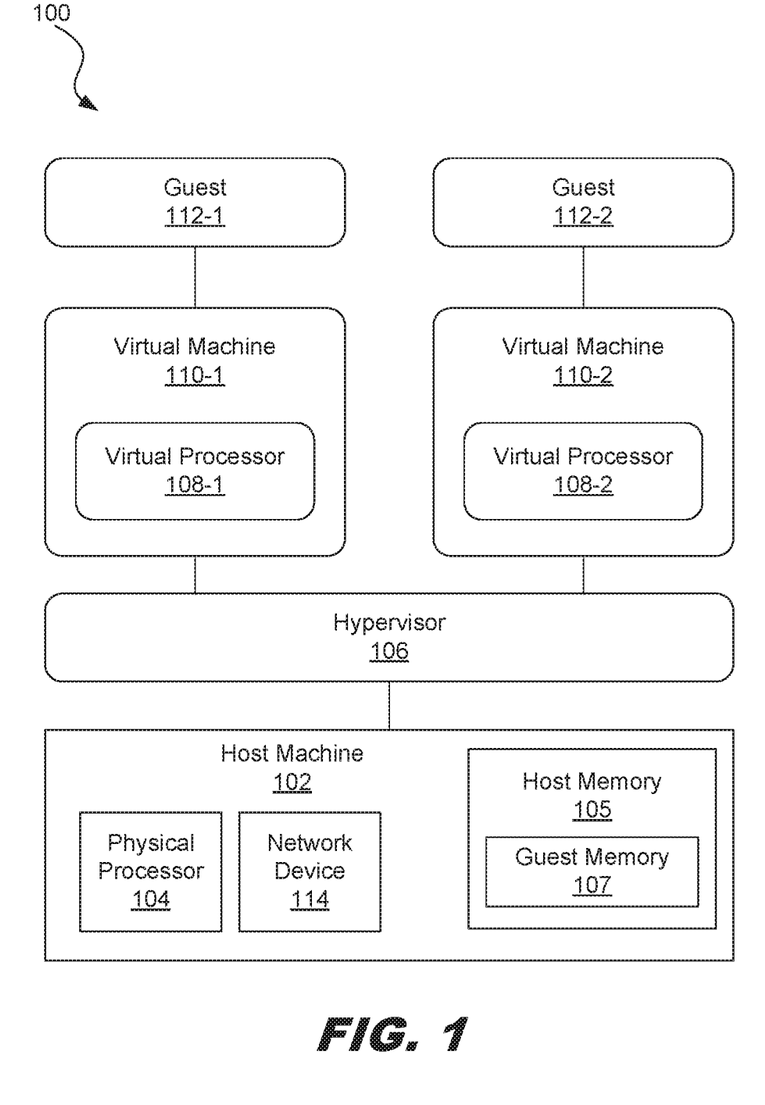
FIG. 1 is a diagram showing an illustrative host system running a plurality of virtual machines, according to one example of principles described herein.

FIG. 1 is a diagram showing an illustrative system 100 involving a plurality of virtual machines 110. According to the present example, a physical system, such as a host machine 102 includes hardware such as a processor 104 and a host memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102. As will be explained in further detail below, a host machine may support more than one hypervisor 106.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 refers to the working memory of the host system. Working memory is typically Random Access Memory (RAM) and is designed for speed. Working memory is often a volatile form of memory, meaning that it loses its data when power is no longer supplied. The host system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses.

A certain portion of the host memory 105 is dedicated to guest memory 107. The total guest memory 107 may be made available for multiple guests 112 to use. As described above, the guest memory may be divided into different regions or modules, each module associated with a different NUMA node. Thus, different processors associated with different NUMA nodes can access different memory regions of guest memory at different speeds, or in a non-uniform manner.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The host machine 102 further includes a network device 114 such as a NIC. The NIC may be configured to communicate with a network through a variety of mechanisms such as wireless, Ethernet, or optical communications.

Figure 2A:
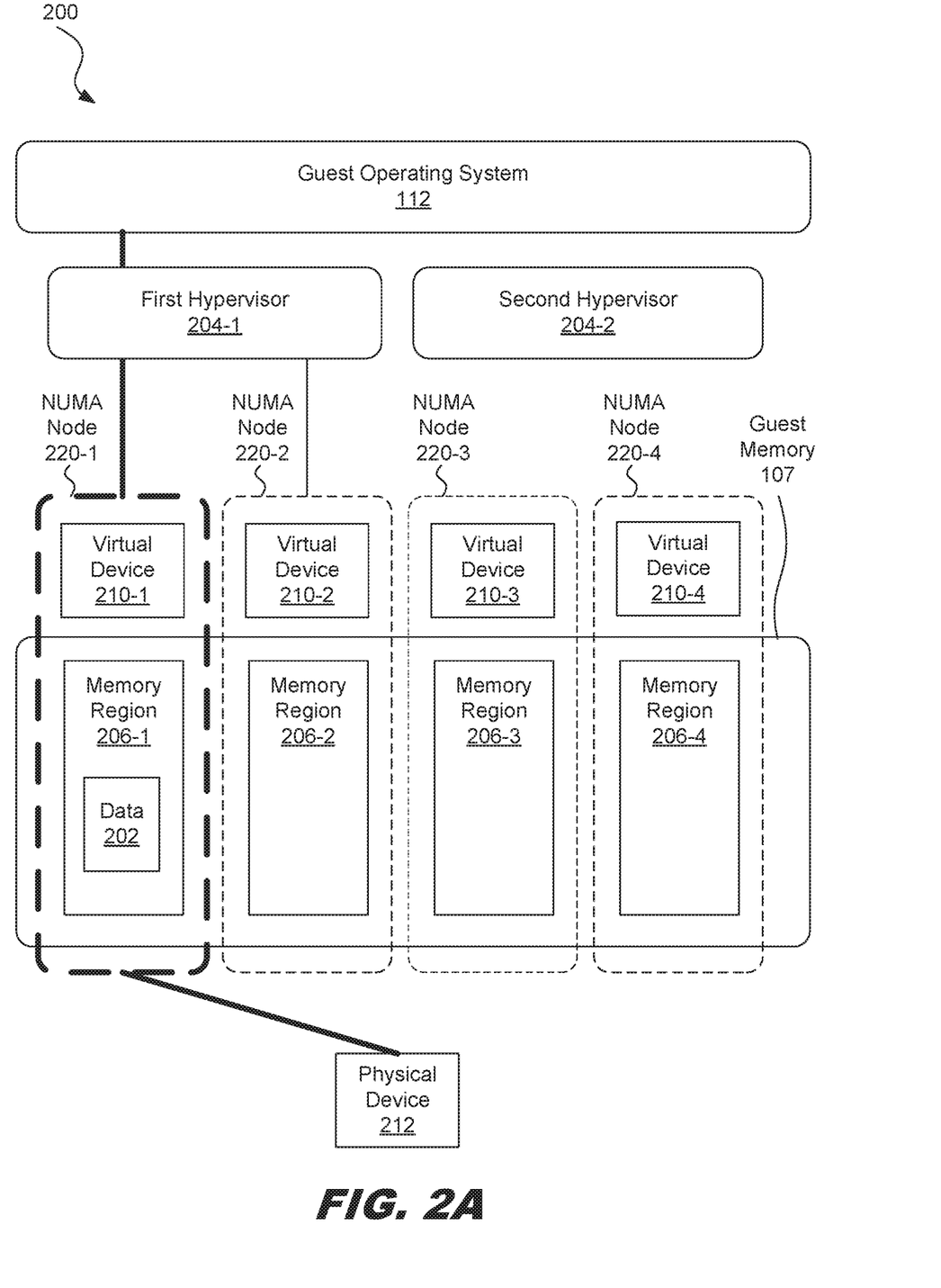
FIGS. 2A and 2B are diagrams illustrating multiple NUMA nodes and multiple virtual devices, according to one example of principles described herein.
Figure 2B:
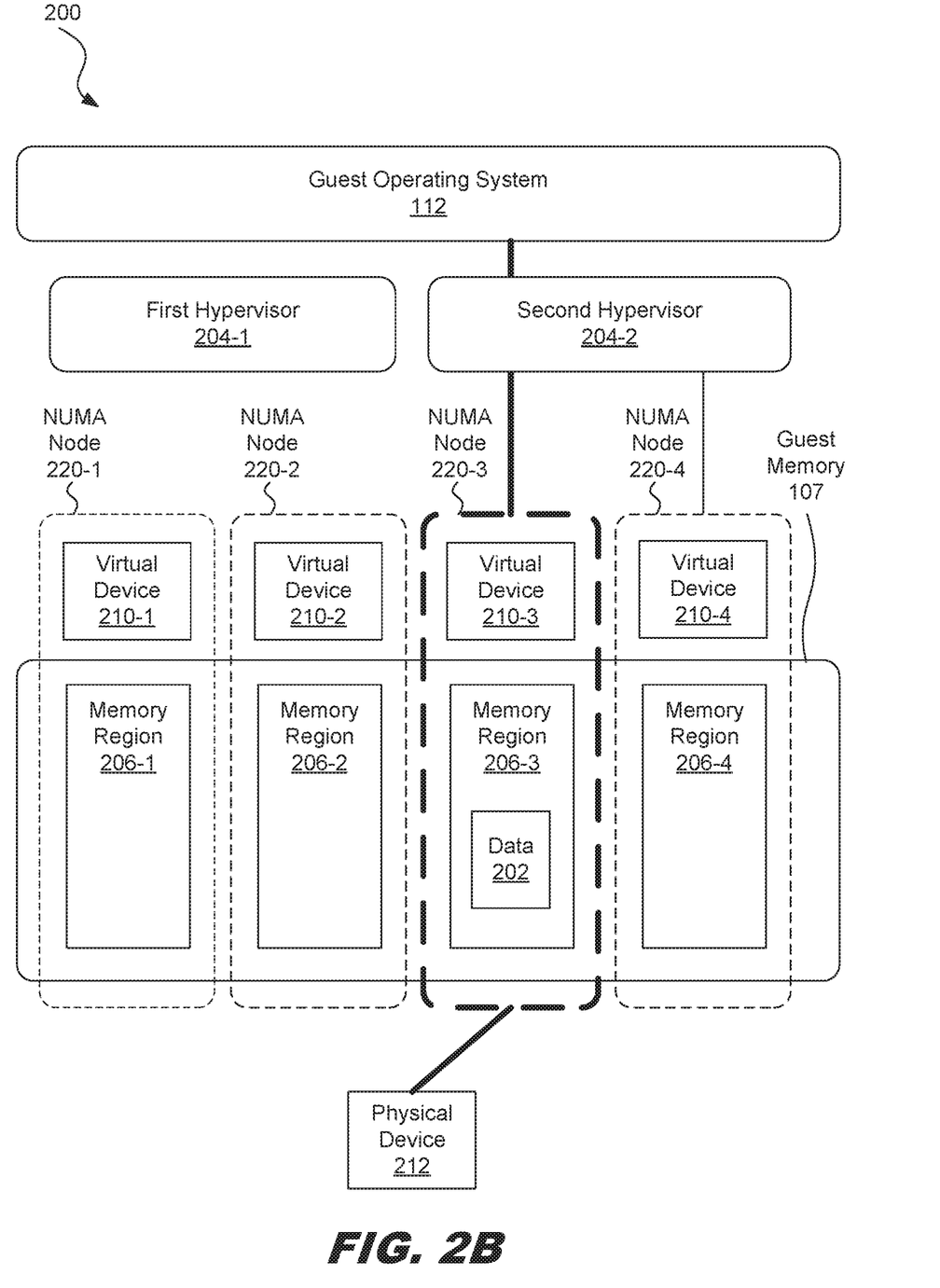

FIGS. 2A and 2B are diagrams illustrating multiple NUMA nodes and multiple virtual devices, according to one example of principles described herein. In the present example, the host machine (e.g., 102, FIG. 1) has four separate NUMA nodes 220-1, 220-2, 220-3, 220-4. Each of the NUMA nodes 220-1, 220-2, 220-3, 220-4 is associated with a different memory region 206-1, 206-2, 206-3, 206-4 of the guest memory 107. For example, NUMA node 220-1 is associated with memory region 206-1, NUMA node 220-2 is associated with memory region 206-2, NUMA node 220-3 is associated with memory region 206-3, and NUMA node 220-4 is associated with memory region 206-4. In some examples, each NUMA node 220 is associated with its own processor. Each processor may be able to access memory in its associated NUMA node quicker than memory associated with other NUMA nodes.

In the present example, the host machine supports two hypervisors. Particularly, the host machine supports first hypervisor 204-1 and second hypervisor 204-2. The first hypervisor 204-1 presents multiple virtual devices 210-1, 210-2 to the guest operating system 112. However, the guest operating system 112 may only have use for one of the virtual devices 210. Thus, in the present example virtual device 210-1 is active and virtual device 210-2 is not active.

In one example, the virtual devices 210-1, 210-2 may be virtual networking devices such as virtual NICs. In such case, the physical device 212 may be a physical NIC (e.g., 114, FIG. 1). The virtual devices 210-1, 210-2 are thus mapped to the physical device 212. In other words, to send data to a different system, virtual or physical, the guest operating system utilizes virtual device 210-1. Specifically, the guest operating system places data 202 to be transmitted over a network in the memory region 206-1 of NUMA node 220-1. At that memory location, the virtual device 210-1 may more efficiently access that data 202 for transmission over the network. If the data 202 were instead placed in a different memory region 206 associated with a different NUMA node 220, then additional processing resources would be consumed by having the virtual device 210-1 of NUMA node 1 access that data.

In some cases, however, an event may occur which causes the guest operating system to no longer be associated with NUMA node 220-1. For example, the guest operating system 112 may migrate from the first hypervisor 204-1 to the second hypervisor 204-2, as shown in FIG. 2B. In some cases, the second hypervisor 204-2 may be associated with different NUMA nodes. In the present example, the second hypervisor 204-2 is associated with NUMA node 220-3 and NUMA node 220-4. The second hypervisor 204-2 may present virtual device 210-3 and virtual device 210-4 to the guest operating system 112. However, the guest operating system 112 may only have use for one of the virtual devices 210. Thus, in the present example virtual device 210-3 is active and virtual device 210-4 is not active.

In the present example, virtual device 210-3 has the same physical address (e.g., MAC address) as virtual device 210-1. Thus, the ARP tables of routers in the network do not have to be updated to handle traffic to the guest operating system 112 after the switch from the first hypervisor 204-1 to the second hypervisor 204-2. The guest operating system 112 may thus use the virtual device 210-3 by storing data 202 to be transmitted in memory region 206-3 of NUMA node 220-3. Without using principles described herein, the guest operating system may still be using a virtual device associated with NUMA node 220-1 even after the switch to the second hypervisor 204-2. This would have consumed additional computing resources because the data stored for transmission would be stored in the memory region 206-3 of NUMA node 220-3 while the virtual device responsible for transmitting that data would still be associated with NUMA node 220-1. Or, as part of the switch to the second hypervisor 204-2, the second hypervisor would have to instantiate a new virtual device which may have a different MAC address, which would cause additional networking resources to be consumed. For example, ARP tables would have to be updated.

In some examples of principles described herein, each of the virtual devices 210-1, 210-2, 210-3, 210-4 may be instantiated when the guest operating system 112 is first instantiated. Thus, each of the virtual devices are available before the event that causes the guest operating system 112 to switch to different NUMA nodes.

Other events that cause the guest operating system 112 to no longer be associated with a particular NUMA node may be used in accordance with principles described herein. For example, an event may cause NUMA node 220-1 to become unavailable. Thus, the first hypervisor 204-1 may switch to the virtual device 210-2 of NUMA node 220-2.

While the present example shows NUMA node 220-1 and 220-2 as being associated exclusively with the first hypervisor 204-1, and NUMA node 220-3 and 220-4 as being associated exclusively with the second hypervisor 204-2, other situations are possible. For example, the first hypervisor 204-1 may be associated with NUMA nodes 220-1, 220-2, and 220-3. In addition, the second hypervisor 204-2 may be associated with NUMA nodes 220-2, 220-3, and 220-4. In other words, there may be some overlap of NUMA nodes between the hypervisors 204-1, 204-2.

Figure 3A:
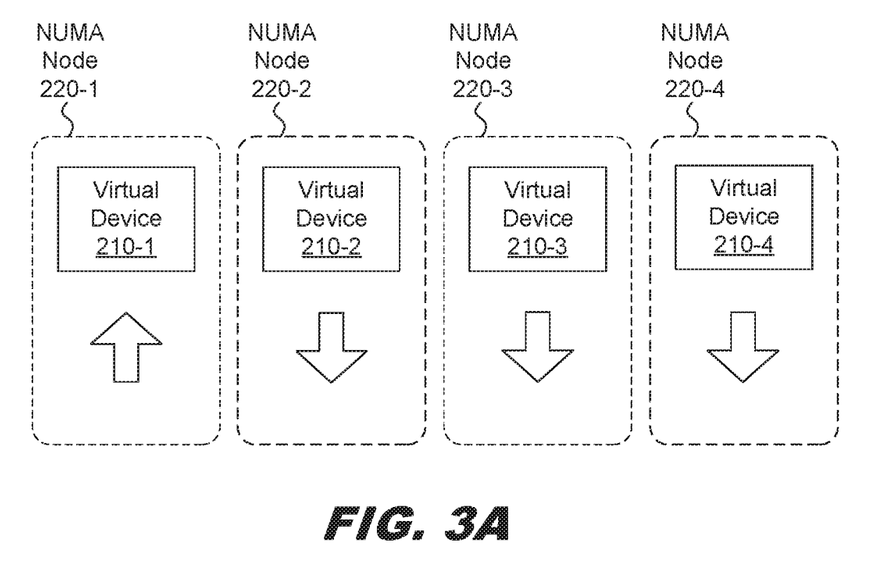
FIGS. 3A and 3B are diagrams illustrating virtual NICs sending up and down signals, according to one example of principles described herein.
Figure 3B:
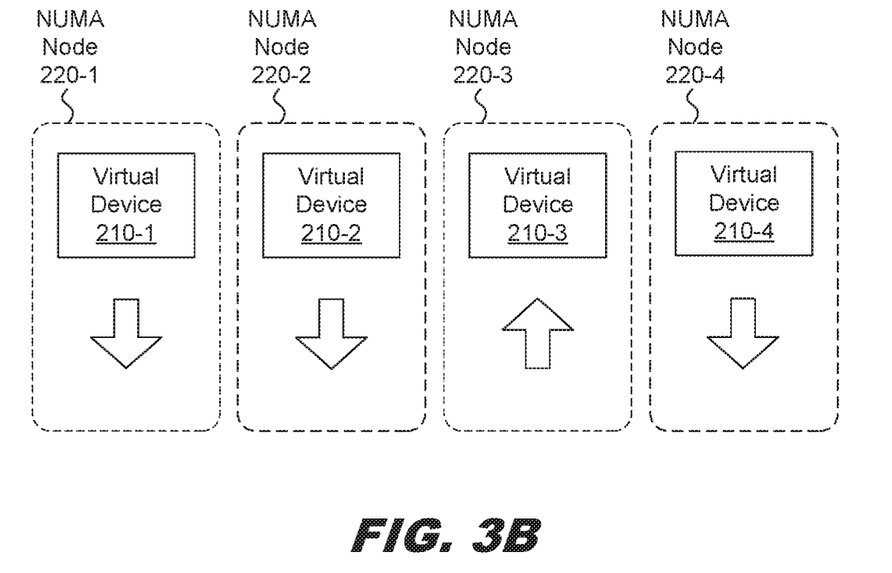

FIGS. 3A and 3B are diagrams illustrating virtual NICs sending up and down signals. As described above, one example of multiple instances of virtual devices that are mapped to a physical device is multiple instances of virtual NICs that are mapped to a physical NIC. When doing so, the NICs that are not currently being used may report a link disabled signal. In other words, the NICs that are not being used are inactive.

FIG. 3A illustrates the four virtual devices 210-1, 210-2, 210-3, 210-4 associated with their respective NUMA nodes 220-1, 220-2, 220-3, 220-4. Virtual device 210-1 is reporting a link enabled signal and virtual devices 210-2, 210-3, and 210-4 are reporting a link disabled signal. This is the state when the guest operating system is associated with at least NUMA node 220-1.

FIG. 3B also illustrates the four virtual devices 210-1, 210-2, 210-3, 210-4 associated with their respective NUMA nodes 210-1, 210-2, 210-3, 210-4. Virtual device 210-3 is reporting a link enabled signal and virtual devices 210-1, 210-2, and 210-4 are reporting a link disabled signal. This is the state when the guest operating system is associated with at least NUMA node 220-3.

Figure 4:
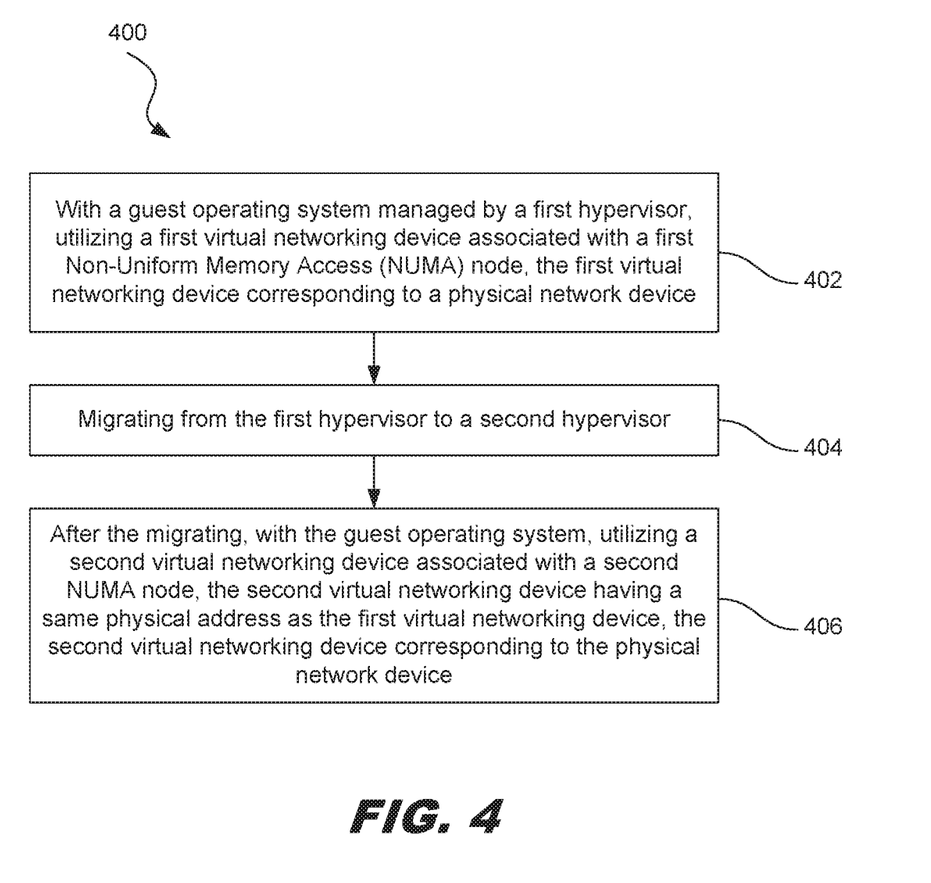
FIG. 4 is a flowchart showing an illustrative method for dynamic virtual input/output NUMA node management, according to one example of principles described herein.

FIG. 4 is a flowchart showing an illustrative method for dynamic virtual input/output NUMA node management. According to the present example, the method 400 includes a step 402 for, with a guest operating system managed by a first hypervisor, utilizing a first virtual networking device (e.g., 210-1, FIG. 2A) associated with a first Non-Uniform Memory Access (NUMA) node (e.g., 220-1, FIG. 2A), the first virtual networking device corresponding to a physical network device (e.g., 212, FIG. 2A). To utilize the first virtual networking device, the guest operating system may place data to be transmitted in a region of guest memory. That region of guest memory may be part of the first NUMA node. Further, data received over the network may be placed in that region of memory, before being processed by the guest operating system. Utilization may also include forwarding packets between a device and a host network.

The method 400 further includes a step 404 for migrating from the first hypervisor to a second hypervisor. The migration may occur for a number of reasons. For example, the migration may occur in response to load balancing operations.

The second hypervisor may be associated with a different set of NUMA nodes than the first hypervisor. The different set may be at least partially overlapping with the first set. However, it may be the case that the NUMA node associated with the first virtual networking device is not part of the set associated with the second NUMA node. Thus, the guest will not be able to write data to the region of memory associated with the first NUMA node. The guest operating system may still use the first virtual networking device, but it will be less efficient because the data written by the guest would not be in the same NUMA node as the first virtual networking device. However, according to principles herein, multiple virtual networking devices are instantiated and presented to the guest operating system.

The method 400 further includes a step 406, for, after the migrating, with the guest operating system, utilizing a second virtual networking device associated with a second NUMA node, the second virtual networking device having a same physical address as the first virtual networking device, the second virtual networking device corresponding to the physical network device. The second NUMA node is associated with the second hypervisor to which the guest operating system has migrated. Thus, to utilize the second virtual networking device, the guest operating system may place data to be transmitted in a region of guest memory that is associated with the second NUMA node. Further, data received over the network may be placed in that region of memory, before being processed by the guest operating system. Utilization may also include forwarding packets between a device and a host network.

The second virtual networking device may have been available in the second NUMA node before the migration, or before an event that caused the migration. Thus, the guest operating system does not have to wait for the second virtual device to be instantiated before it can begin using it. Instead, the second virtual networking device may switch from reporting a link disabled signal to reporting a link enabled signal in response to the migration. The second virtual networking device may also share the same physical address (e.g., MAC address) as the first virtual networking device, and any other virtual networking device associated with the other nodes. Thus, the migration of the guest operating system, and switch to use of a different virtual networking device, does not trigger network reconfiguration. Specifically, it does not trigger updating of ARP tables.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising,
migrating a guest operating system from a first hypervisor to a second hypervisor, the first hypervisor utilizing a first virtual networking device associated with a first Non-Uniform Memory Access (NUMA) node, the first virtual networking device corresponding to a physical network device; and
after the migrating, with the second hypervisor, providing to the guest operating system, a second virtual networking device associated with a second NUMA node, the second virtual networking device having a same physical address as the first virtual networking device, the second virtual networking device corresponding to the physical network device.

2. The method of claim 1, wherein utilizing the first virtual networking device comprises storing data within guest memory of the first NUMA node.

3. The method of claim 1, wherein the second virtual networking device is inactive while the guest operating system is utilizing the first virtual networking device.

4. The method of claim 1, wherein the first virtual networking device is inactive while the guest operating system is utilizing the second virtual networking device.

5. The method of claim 1, wherein, in response to the migrating the first virtual networking device reports a link disabled signal.

6. The method of claim 1, wherein, in response to the migrating the second virtual networking device reports a link enabled signal.

7. The method of claim 1, wherein the physical address is a Media Access Control (MAC) address.

8. A method performed by a physical computing system, the method comprising:
providing a plurality of Non-Uniform Memory Access (NUMA) nodes;
providing a plurality of virtual networking devices, each of the virtual networking devices being associated with a different one of the plurality of NUMA nodes, each of the virtual networking devices having a same physical address;
with a guest operating system, utilizing a first one of the virtual networking devices corresponding to a first one of the NUMA nodes while the guest operating system is associated with the first one of the NUMA nodes; and
with a guest operating system, utilizing a second one of the virtual networking devices corresponding to a second one of the NUMA nodes while the guest operating system is associated with the second one of the NUMA nodes and no longer associated with the first one of the NUMA nodes.

9. The method of claim 8, wherein the guest operating system is managed by a first hypervisor while the guest operating system is associated with the first one of the NUMA nodes.

10. The method of claim 9, further comprising, migrating the guest operating system from the first hypervisor to a second hypervisor.

11. The method of claim 10, wherein the guest operating system is managed by the second hypervisor while the guest operating system is associated with the second one of the NUMA nodes.

12. The method of claim 8, further comprising, while the guest operating system is utilizing the first one of the virtual networking devices, all other of the plurality of the virtual networking devices are inactive.

13. The method of claim 12, further comprising, receiving a link disabled signal from the first virtual networking device when the guest operating system becomes disassociated with the first one of the NUMA nodes.

14. The method of claim 12, further comprising, receiving a link enabled signal from the second virtual networking device when the guest operating system becomes associated with the second one of the NUMA nodes.

15. The method of claim 8, wherein utilizing the first one of the virtual networking devices includes storing data in guest memory of the first one of the NUMA nodes.

16. The method of claim 8, wherein each of the virtual networking devices corresponds to a single physical networking device.

17. A system comprising:
a processor;
a physical network device; and
a memory having:
  a plurality of regions, each region corresponding to a different one of a plurality of Non-Uniform Memory Access (NUMA) nodes; and
  machine readable instructions that when executed by the processor, cause the system to:
  with a first hypervisor, support a guest operating system, the first hypervisor providing a first plurality of virtual networking devices to the guest operating system, each of the first plurality of virtual networking devices associated with a different one of the plurality of NUMA nodes; and
  migrate the guest operating system to a second hypervisor, the second hypervisor providing a second plurality of virtual networking devices to the guest operating system, each of the second plurality of virtual networking devices associated with a different one of the plurality of NUMA nodes;
  wherein the first plurality of virtual networking devices and the second plurality of virtual networking devices share a physical address.

18. The system of claim 17, wherein the system is further to utilize a virtual networking device from the first plurality of virtual networking devices for the guest operating system while the first hypervisor is managing the guest operating system.

19. The system of claim 17, wherein the system is further to utilize a virtual networking device from the second plurality of virtual networking devices for the guest operating system while the second hypervisor is managing the guest operating system.

20. The system of claim 17, wherein virtual networking devices not currently used by the guest operating system are inactive.

* * * * *